United States Patent
Shin et al.

(10) Patent No.: US 9,630,625 B2
(45) Date of Patent: Apr. 25, 2017

(54) APPARATUS AND METHOD FOR IDENTIFYING SURROUNDING VEHICLES

(71) Applicant: Hyundai Motor Company, Seoul (KR)

(72) Inventors: Ki Cheol Shin, Gyeonggi-do (KR); Myung Seon Heo, Seoul (KR); Young Chul Oh, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 16 days.

(21) Appl. No.: 14/870,043

(22) Filed: Sep. 30, 2015

(65) Prior Publication Data

US 2016/0297436 A1 Oct. 13, 2016

(30) Foreign Application Priority Data

Apr. 9, 2015 (KR) .................. 10-2015-0050395

(51) Int. Cl.
*B60W 30/16* (2012.01)
*B60W 40/04* (2006.01)

(52) U.S. Cl.
CPC ............ *B60W 30/16* (2013.01); *B60W 40/04* (2013.01); *B60W 2550/302* (2013.01); *B60W 2550/308* (2013.01); *B60W 2550/408* (2013.01)

(58) Field of Classification Search
CPC ................. B60W 30/16; B60W 40/04; B60W 2550/302; B60W 2550/308; B60W 2550/408
See application file for complete search history.

(56) References Cited

U.S. PATENT DOCUMENTS

| 2005/0021201 A1* | 1/2005 | Klotz | B60W 30/16 702/189 |
| 2010/0225762 A1* | 9/2010 | Augst | B60R 1/00 348/148 |

(Continued)

FOREIGN PATENT DOCUMENTS

| JP | 2005-050187 A | 2/2005 |
| JP | 2007-28060 A | 10/2007 |

(Continued)

OTHER PUBLICATIONS

Wenjing Cao et al., "Automotive longitudinal speed pattern generation with acceleration constraints aiming at model predictive control method," Year: 2013, pp. 1-6.*

(Continued)

*Primary Examiner* — Tuan C. To
(74) *Attorney, Agent, or Firm* — Mintz Levin Cohn Ferris Glovsky and Popeo, P.C.; Peter F. Corless

(57) ABSTRACT

An apparatus and method for identifying surrounding vehicles is provided. The apparatus includes a sensor that measures position coordinates of a first surrounding vehicle and a yaw rate and a speed of a subject vehicle and a V2V communication unit that receives a coordinate history and a speed from the plurality of surrounding vehicles. Additionally, a controller generates a traveling trajectory and a speed pattern as first identification information by applying accumulated behaviors of the subject vehicle to the position coordinates of the first surrounding vehicle and calculate each traveling trajectory and speed pattern as n-th identification information based on the coordinate history and the speed received via the V2V communication unit. The controller then compares the first identification information with the n-th identification information to recognize the surrounding vehicle corresponding to identification information most (Continued)

similar to the first identification information as the first surrounding vehicle.

15 Claims, 7 Drawing Sheets

(56) References Cited

U.S. PATENT DOCUMENTS

| | | | |
|---|---|---|---|
| 2011/0295549 A1* | 12/2011 | Takabayashi | G01S 7/4004 |
| | | | 702/142 |
| 2013/0158830 A1 | 6/2013 | Kurumisawa et al. | |
| 2013/0282277 A1 | 10/2013 | Rubin et al. | |
| 2014/0070980 A1 | 3/2014 | Park | |
| 2014/0176350 A1* | 6/2014 | Niehsen | B62D 15/025 |
| | | | 340/988 |
| 2014/0249691 A1* | 9/2014 | Hafner | B62D 13/06 |
| | | | 701/1 |
| 2014/0324312 A1 | 10/2014 | Okuya et al. | |
| 2014/0358840 A1* | 12/2014 | Tadic | B60W 40/09 |
| | | | 706/52 |
| 2015/0298621 A1* | 10/2015 | Katoh | B60R 11/04 |
| | | | 348/148 |
| 2016/0101779 A1* | 4/2016 | Katoh | G06T 7/60 |
| | | | 340/435 |
| 2016/0280265 A1* | 9/2016 | Hass | B60W 30/09 |

FOREIGN PATENT DOCUMENTS

| | | |
|---|---|---|
| JP | 2008-046873 A | 2/2008 |
| JP | 2014-215878 A | 11/2014 |
| KR | 10-2014-0033277 | 3/2014 |
| KR | 10-2014-0092175 | 7/2014 |
| KR | 10-1455708 | 10/2014 |

OTHER PUBLICATIONS

Zuchao Wang et al., "Visual Traffic Jam Analysis Based on Trajectory Data," Year: 2013, vol. 19, pp. 2159-2168.*

* cited by examiner

APPARATUS AND METHOD FOR IDENTIFYING SURROUNDING VEHICLES

CROSS-REFERENCE TO RELATED APPLICATION

This application is based on and claims the benefit of priority to Korean Patent Application No. 10-2015-0050395, filed on April 9, 2015 in the Korean Intellectual Property Office, the disclosure of which is incorporated herein in its entirety by reference.

TECHNICAL FIELD

The present disclosure relates to an apparatus and a method for identifying surrounding vehicles, and more particularly, to a technology for rapidly and accurately identifying surrounding vehicles by fusing various types of sensors within a vehicle with vehicle to vehicle (V2V) communications.

BACKGROUND

The existing apparatus currently developed for identifying surrounding vehicles directly receives velocity, acceleration, angular velocity, global positioning system (GPS) data, etc., from the surrounding vehicles via V2V communications and therefore may determine a condition of the surrounding vehicles. However, positions of the surrounding vehicles and a distance from a subject vehicle are detected using GPS data transmitted from the surrounding vehicles, and therefore it may be difficult to accurately detect the positions due to GPS errors. In other words, it may be difficult to accurately identify the surrounding vehicles transmitting the GPS data.

SUMMARY

The present disclosure provides an apparatus and a method for identifying surrounding vehicles capable of providing improved accuracy identification ability by comparing a traveling trajectory and a speed pattern generated by applying accumulated behaviors of a subject vehicle (e.g., a traveling vehicle) to position coordinates of surrounding vehicles with a traveling trajectory and a speed pattern calculated based on coordinate history and speed received from the surrounding vehicles to identify the surrounding vehicles.

The foregoing and other objects, features, aspects and advantages of the present disclosure will be understood and become more apparent from the following detailed description of the present disclosure.

According to an exemplary embodiment of the present disclosure, an apparatus for identifying surrounding vehicles may include: a sensor configured to measure position coordinates of a first surrounding vehicle and a yaw rate and a speed of a subject vehicle; a V2V communication unit configured to receive a coordinate history and a speed from the plurality of surrounding vehicles; and a controller configured to generate a traveling trajectory and a speed pattern (hereinafter, 'first identification information') by applying accumulated behaviors of the subject vehicle to the position coordinates of the first surrounding vehicle, calculate each traveling trajectory and speed pattern (hereinafter, 'n-th identification information') based on the coordinate history and the speed received via the V2V communication unit, and then compare the first identification information with the n-th identification information to recognize the surrounding vehicle that corresponds to identification information most similar to the first identification information as the first surrounding vehicle.

According to another exemplary embodiment of the present disclosure, a method for identifying surrounding vehicles may include: measuring, by a sensor, position coordinates of a first surrounding vehicle and a yaw rate and a speed of a subject vehicle; receiving, by a V2V communication unit, a coordinate history and a speed from the plurality of surrounding vehicles; and generating, by a controller, a traveling trajectory and a speed pattern (hereinafter, 'first identification information') by applying accumulated behaviors of the subject vehicle to the position coordinates of the first surrounding vehicle, calculating each traveling trajectory and speed pattern (hereinafter, 'n-th identification information') based on the coordinate history and the speed received via the V2V communication unit, and then comparing the first identification information with the n-th identification information to recognize the surrounding vehicle that corresponds to identification information most similar to the first identification information as the first surrounding vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
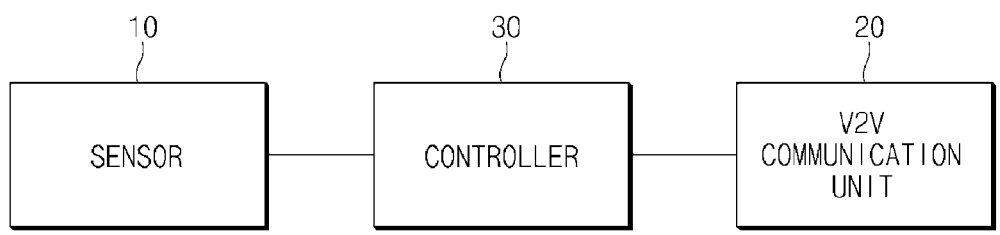
FIG. 1 is a configuration diagram of an apparatus for identifying surrounding vehicles according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and *the* are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

The foregoing objects, features and advantages will become more apparent from the following detailed description of exemplary embodiments of the present disclosure with reference to accompanying drawings, which are set forth hereinafter. Accordingly, those having ordinary knowledge in the related art to which the present disclosure pertains will easily embody technical ideas or spirit of the present disclosure. Further, when the detailed description of technologies known in the related art are considered to make the gist of the present disclosure obscure in the present disclosure, the detailed description thereof will be omitted. Hereinafter, exemplary embodiments of the present disclosure will be described in detail with reference to the accompanying drawings.

FIG. 1 is a configuration diagram of an apparatus for identifying surrounding vehicles according to an exemplary embodiment of the present disclosure. As illustrated in FIG. 1, the apparatus for identifying surrounding vehicles may include a sensor 10, a V2V communication unit 20, and a controller 30.

In particular, the sensor 10 may be a sensor configured to measure various types of traveling information within a vehicle and may include a light detection and ranging (Lidar) sensor configured to measure positions (e.g., coordinates) of the surrounding vehicles and a distance from a subject vehicle (e.g., a traveling vehicle), a yaw rate sensor, a speedometer, a steering sensor, etc. The V2V communication unit 20 may provide a communication interface with the surrounding vehicles. In particular, the V2V communication unit 20 may be configured to receive a coordinate history and a speed as well as various types of traveling information from surrounding vehicles.

Further, the controller 30 may be configured to operate each component to normally perform their own functions (e.g., operate the components to execute functions without failure or with minimal error). Particularly, the controller 30 may be configured to generate a traveling trajectory and a speed pattern (hereinafter, first identification information) by applying accumulated behaviors of a subject vehicle to position coordinates of a first surrounding vehicle which are acquired from the Lidar sensor, calculate each traveling trajectory and speed pattern (n-th identification information) based on coordinate history and speed received from the plurality of surrounding vehicles via the V2V communication unit 20.

In addition, the controller 30 may be configured to compare the first identification information with the n-th identification information, thereby recognizing the surrounding vehicle that corresponds to the most similar identification information as the first surrounding vehicle. The traveling trajectory may be expressed by a polynomial form and the controller 30 may be configured to determine traveling trajectories having the most similar coefficients of polynomial (e.g., difference in coefficients of two polynomials is minimal) as having a highest similarity.

Figure 2:
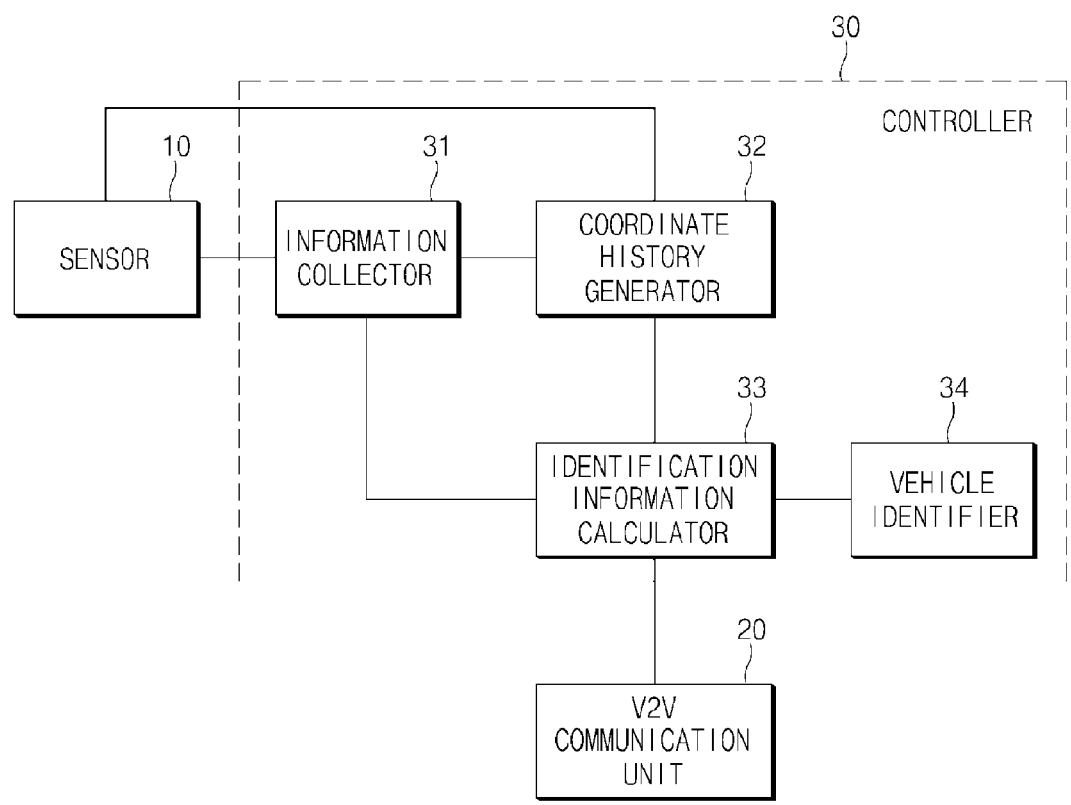
FIG. 2 is a detailed configuration diagram of a controller used to identify surrounding vehicles according to the exemplary embodiment of the present disclosure.

Hereinafter, a function of the controller 30 will be described in detail with reference to FIG. 2. FIG. 2 is a detailed configuration diagram of the controller of the apparatus for identifying surrounding vehicles according to the exemplary embodiment of the present disclosure. As illustrated in FIG. 2, the controller of the apparatus may include an information collector 31, a coordinate history generator 32, an identification information calculator 33, and a vehicle identifier 34. The various components or units of the controller may all be operated by the controller to execute their individual functions.

Figure 3:
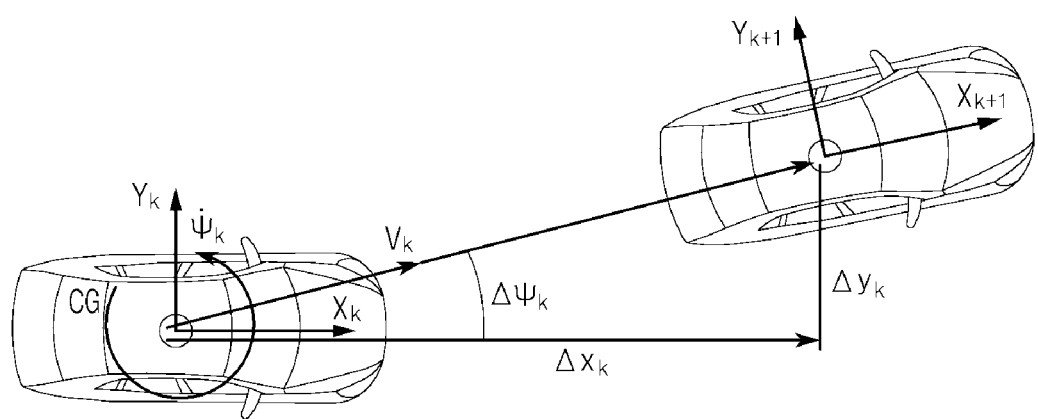
FIG. 3 is a diagram illustrating a behavior calculated by a coordinate history generator according to an exemplary embodiment of the present disclosure.

The information collector 31 may be configured to collect or acquire various types of information using the sensor 10. In particular, the gathered information may include position coordinates x and y of the first surrounding vehicle, a yaw rate $\Psi$ and a speed v of a subject vehicle, etc. The coordinate history generator 32 may then be configured to use the position coordinates x and y of the first surrounding vehicle, the yaw rate $\Psi$ of the subject vehicle, and a vehicle model among the information collected by the information collector 31 to calculate the behaviors $\Delta x$, $\Delta y$, and $\Delta \Psi$ of the subject vehicle as illustrated in FIG. 3. The vehicle model may include a dynamic model, a kinematic model, or the like which are a mathematical model that express the behaviors of the vehicle (e.g., the traveling or subject vehicle) and the behavior also represents a change in position of the subject vehicle and a change in the corresponding angle.

Figure 4:
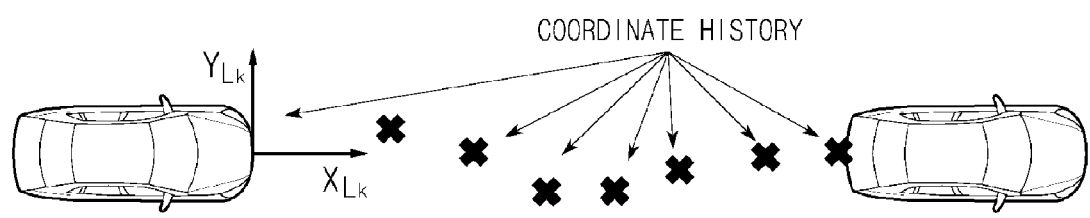
FIG. 4 is an exemplified diagram of a generated coordinate history according to the exemplary embodiment of the present disclosure.
Figure 5:
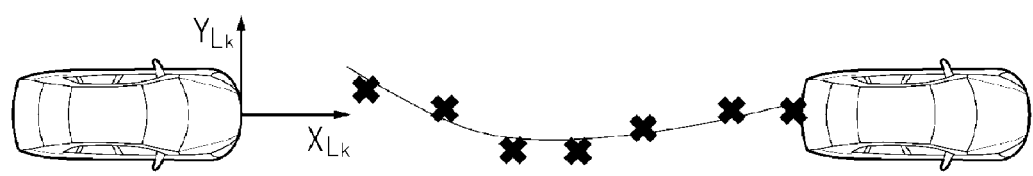
FIG. 5 is an exemplified diagram of a calculated traveling trajectory according to an exemplary embodiment of the present disclosure.

Further, the coordinate history generator 32 may be configured to accumulate the calculated behavior and generate the coordinate history as illustrated in FIG. 4. The identification information calculator 33 may then be configured to use the coordinate history generated by the coordinate history generator 32 to generate a traveling trajectory K. In other words, the identification information calculator 33 may be configured to fit the coordinate history into a three-dimensional polynomial (e.g., add into or correspond with) which may express a traveling curvature of the vehicle and a conversion of the curvature to generate the traveling trajectory. The traveling trajectory may be based on a sensor coordinate system mounted within the subject vehicle at a present time as illustrated in FIG. 5 and the three-dimensional polynomial may be obtained using the following Equation 1.

$$a_0 + a_1 x + a_2 x^2 + a_3 x^3 = y \tag{1}$$

wherein, the $a_0$, $a_1$, $a_2$, $a_3$ are the coefficients of the polynomial and are a constant.

Figure 6:
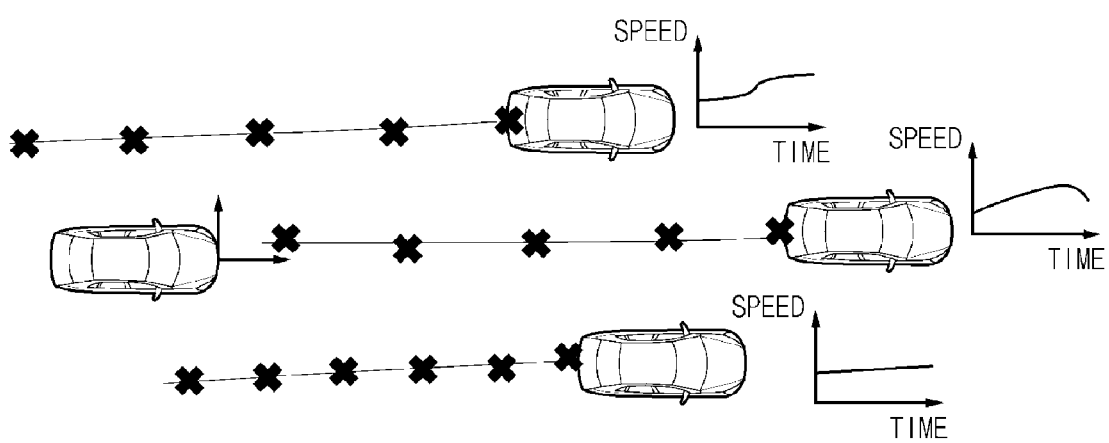
FIG. 6 is an exemplified diagram illustrating a traveling trajectory and a speed pattern according to an exemplary embodiment of the present disclosure.

Moreover, the identification information calculator 33 may be configured to generate a speed pattern P which represents the speed of the subject vehicle based on (e.g., relative to) time as illustrated in FIG. 6. Hereinafter, the K and the P are collectively referred to as the first identification information.

Meanwhile, the identification information calculator 33 may be configured to generate each traveling trajectory and speed pattern (hereinafter, n-th identification information) based on the coordinate history and the speed received from the plurality of surrounding vehicles via the V2V communication unit 20. The vehicle identifier 34 may be configured to recognize the surrounding vehicle that corresponds to the identification information most similar to the first identification information among the n-th identification information as the first surrounding vehicle, adjusting the first identification information to correspond to the n-th identification information representing the plurality of identification information one by one.

In other words, the vehicle identifier 34 may be configured to determine traveling trajectories having the most similar coefficients of polynomial (e.g., difference in coefficients of two polynomials is minimal) as having a highest similarity. The difference between the coefficients may be less than a particular value to thus correspond to most similar coefficients of polynomial.

Referring to the above Equation 1 as an example, when the polynomial representing the traveling trajectory of the first identification information is set to be '$1+2x+3x^2+4x^3=y$' and the first polynomial is set to be '$1+3x+4x^2+5x^3=y$', a second polynomial may '$1+3x+4x^2+4x^3=y$', and a third polynomial may set to be '$1+4x+5x^2+6x^3=y$' which are a comparison target, the polynomial having the highest similarity becomes the second polynomial. Therefore, the surrounding vehicle that corresponds to the second polynomial may be recognized as the first surrounding vehicle.

Figure 7:
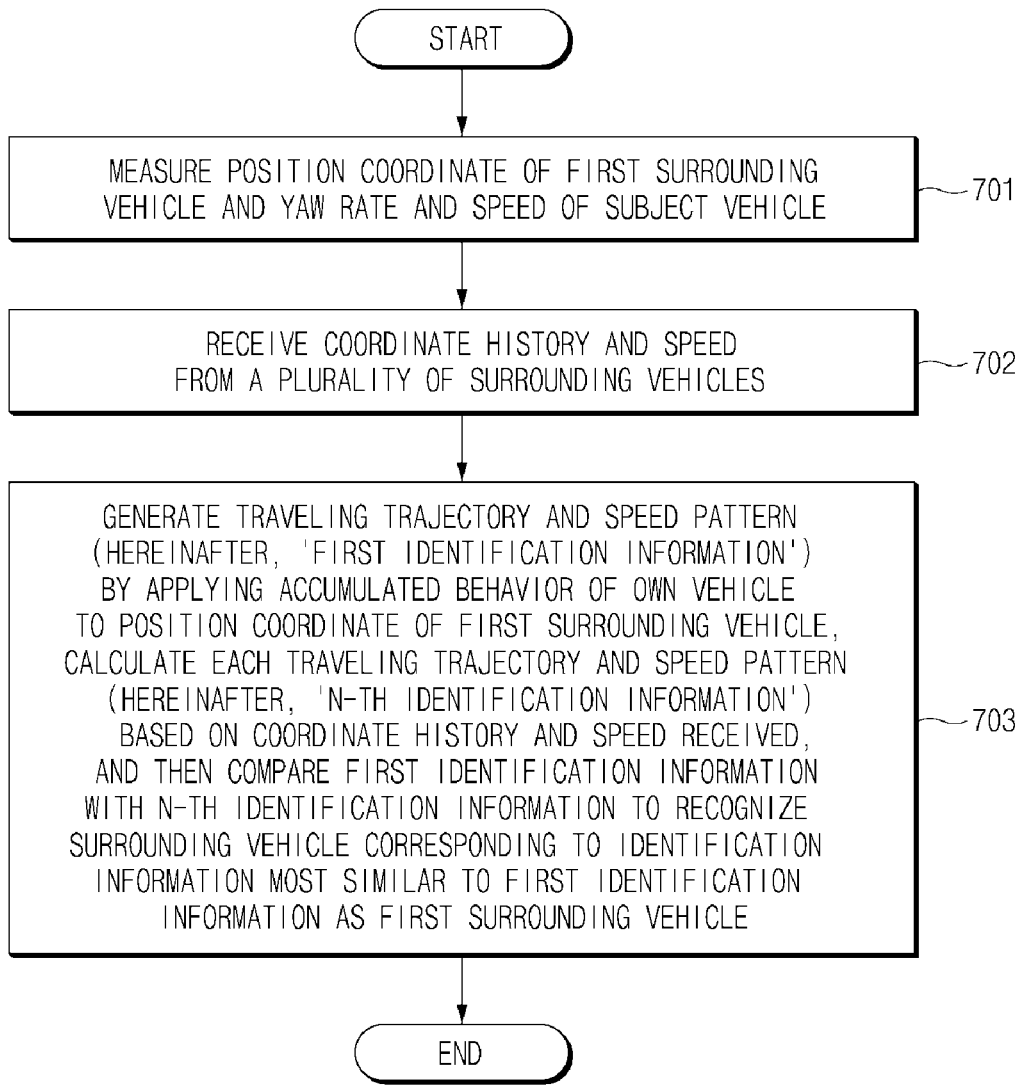
FIG. 7 is a flow chart of a method for identifying surrounding vehicles according to an exemplary embodiment of the present disclosure.

FIG. 7 is a flow chart of a method for identifying surrounding vehicles according to an exemplary embodiment of the present disclosure. First, the sensor 10 may be configured to measure the position coordinates of the first surrounding vehicle and the yaw rate and the speed of the subject vehicle (701). Further, the V2V communication unit 20 may be configured to receive the coordinate history and the speed from the plurality of surrounding vehicles (702).

The controller 30 may then be configured to generate the traveling trajectory and the speed pattern (hereinafter, 'first identification information') by applying the accumulated behaviors of the subject vehicle to the position coordinates of the first surrounding vehicle, calculate each traveling trajectory and speed pattern (hereinafter, 'n-th identification information') based on the coordinate history and the speed received via the V2V communication unit, and then compare the first identification information with the n-th identification information, thereby recognizing the surrounding vehicle that corresponds to the identification information most similar to the first identification information as the first surrounding vehicle (703).

As described above, according to the exemplary embodiments of the present disclosure, the surrounding vehicles may be identified by comparing the traveling trajectory and the speed pattern generated by applying the accumulated behaviors of the subject vehicle to the position coordinates of the surrounding vehicles with the traveling trajectory and the speed pattern calculated based on the coordinate history and the speed received from the surrounding vehicles, thereby providing an improved accuracy identification ability.

Further, the present disclosure may be applied to various service systems required to identify the vehicles by identifying the vehicle that transmit data with high accuracy. The present disclosure may also be applied to various service systems required to identify the vehicles to acquire data (e.g., velocity, acceleration, angular velocity) from the surrounding vehicles via the V2V communications and acquire the positions of the surrounding vehicles that transmit the data by the Lidar sensor, thereby providing the high accuracy service.

Meanwhile, the method according to the exemplary embodiment of the present disclosure as described above may be prepared by a computer program. Codes and code segments configuring the computer program may be easily deduced by computer programmers in the art. In addition, the computer program is stored in computer readable recording media (information storage media) and is read and executed by computers, thereby implementing the methods according to the present disclosure. Further, the recording media may include any type of recording media which may be read by a computer.

The present disclosure described above may be variously substituted, altered, and modified by those skilled in the art to which the present disclosure pertains without departing from the scope and sprit of the present disclosure. Therefore, the present disclosure is not limited to the above-mentioned exemplary embodiments and the accompanying drawings.

What is claimed is:

1. An apparatus for identifying surrounding vehicles, comprising:
   a sensor configured to measure position coordinates of a first surrounding vehicle and a yaw rate and a speed of a subject vehicle;
   a vehicle-to-vehicle (V2V) communication unit configured to receive coordinate history and speed from the plurality of surrounding vehicles; and
   a controller configured to:
   generate a traveling trajectory and a speed pattern as first identification information by applying accumulated behaviors of the subject vehicle to the position coordinates of the first surrounding vehicle;
   calculate each traveling trajectory and speed pattern as n-th identification information based on the coordinate history and the speed received via the V2V communication unit; and
   compare the first identification information with the n-th identification information to recognize the surrounding vehicle that corresponds to identification information most similar to the first identification information as the first surrounding vehicle.

2. The apparatus of claim 1, wherein the controller includes:
   an information collector configured to collect the position coordinates x and y of the first surrounding vehicle and the yaw rate and the speed of the subject vehicle using the sensor;
   a coordinate history generator configured to calculate the behaviors of the subject vehicle by applying a vehicle model to the collected position coordinates of the first surrounding vehicle and the yaw rate of the subject vehicle and generate the coordinate history by accumulating the calculated behaviors;
   an identification information calculator configured to generate a traveling trajectory K using the generated coordinate history, generate a speed pattern P that represents the speed of the subject vehicle based on time, and generate the n-th identification information based on the coordinate history and the speed received from the plurality of surrounding vehicles via the V2V communication unit; and a vehicle identifier configured to adjust the traveling trajectory K and the speed pattern P to correspond to the n-th identification information representing the plurality of identification information one by one, detect identification information most similar to the traveling trajectory K and the speed pattern P in the n-th identification information, and recognize the surrounding vehicle that corresponds to the detected identification information as the first surrounding vehicle.

3. The apparatus according to claim 1, wherein the sensor includes a light detection and ranging (Lidar) sensor configured to measure the position coordinates of the surrounding vehicle.

4. The apparatus according to claim 1, wherein the traveling trajectory is expressed by the following Equation A.

$$a_0 + a_1 x + a_2 x^2 + a_3 x^3 = y \quad (A)$$

wherein, the $a_0$, $a_1$, $a_2$, $a_3$ are coefficients of a polynomial and are a constant, and x and y represent position coordinates.

5. The apparatus according to claim 2, wherein the vehicle model is any one of a dynamic model and a Kinematic model.

6. A method for identifying surrounding vehicles, comprising:
measuring, by a sensor, position coordinates of a first surrounding vehicle and a yaw rate and a speed of a subject vehicle;
receiving, by a vehicle-to-vehicle (V2V) communication unit, coordinate history and speed from the plurality of surrounding vehicles;
generating, by a controller, a traveling trajectory and a speed pattern as first identification information by applying accumulated behaviors of the subject vehicle to the position coordinates of the first surrounding vehicle;
calculating, by the controller, each traveling trajectory and speed pattern as n-th identification information based on the coordinate history and the speed received via the V2V communication unit; and
comparing, by the controller, the first identification information with the n-th identification information to recognize the surrounding vehicle that corresponds to identification information most similar to the first identification information as the first surrounding vehicle.

7. The method according to claim 6, wherein the recognizing of coordinate history and speed includes:
collecting, by the controller, the position coordinates x and y of the first surrounding vehicle and the yaw rate and the speed of the subject vehicle from the sensor;
calculating, by the controller, the behaviors of the subject vehicle by applying a vehicle model to the collected position coordinates of the first surrounding vehicle and the yaw rate of the subject vehicle and generating the coordinate history by accumulating the calculated behaviors;
generating, by the controller, a traveling trajectory K using the generated coordinate history, generating a speed pattern P that represents the speed of the subject vehicle based on time, and generating the n-th identification information based on the coordinate history and the speed received from the plurality of surrounding vehicles via the V2V communication unit ; and
adjusting, by the controller, the traveling trajectory K and the speed pattern P to correspond to the n-th identification information that represent the plurality of identification information one by one, detecting identification information most similar to the traveling trajectory K and the speed pattern P in the n-th identification information, and recognizing the surrounding vehicle that corresponds to the detected identification information as the first surrounding vehicle.

8. The method according to claim 6, wherein the position coordinates of the surrounding vehicle are measured by a light detection and ranging (Lidar) sensor.

9. The method according to claim 6, wherein the traveling trajectory is expressed by the following Equation A.

$$a_0 + a_1 x + a_2 x^2 + a_3 x^3 = y \quad (A)$$

wherein, the $a_0$, $a_1$, $a_2$, $a_3$ are the coefficients of the polynomial and are a constant, and x and y are position coordinates.

10. The method according to claim 7, wherein the vehicle model is any one of a dynamic model and a Kinematic model.

11. A non-transitory computer readable medium containing program instructions executed by a controller, the computer readable medium comprising:
program instructions that control a sensor to measure position coordinates of a first surrounding vehicle and a yaw rate and a speed of a subject vehicle;
program instructions that receive by a vehicle-to-vehicle (V2V) communication unit coordinate history and speed from the plurality of surrounding vehicles;
program instructions that generate a traveling trajectory and a speed pattern as first identification information by applying accumulated behaviors of the subject vehicle to the position coordinates of the first surrounding vehicle;
program instructions that calculate each traveling trajectory and speed pattern as n-th identification information based on the coordinate history and the speed received via the V2V communication unit; and
program instructions that compare the first identification information with the n-th identification information to recognize the surrounding vehicle that corresponds to identification information most similar to the first identification information as the first surrounding vehicle.

12. The non-transitory computer readable medium of claim 11, wherein the program instructions for recognizing coordinate history and speed include:
program instructions that collect the position coordinates x and y of the first surrounding vehicle and the yaw rate and the speed of the subject vehicle from the sensor;
program instructions that calculate the behaviors of the subject vehicle by applying a vehicle model to the collected position coordinates of the first surrounding vehicle and the yaw rate of the subject vehicle and generating the coordinate history by accumulating the calculated behaviors;
program instructions that generate a traveling trajectory K using the generated coordinate history, generating a speed pattern P that represents the speed of the subject vehicle based on time, and generating the n-th identification information based on the coordinate history and the speed received from the plurality of surrounding vehicles via the V2V communication unit ; and
program instructions that adjust the traveling trajectory K and the speed pattern P to correspond to the n-th identification information that represent the plurality of identification information one by one, detecting identification information most similar to the traveling trajectory K and the speed pattern P in the n-th identification information, and recognizing the surrounding vehicle that corresponds to the detected identification information as the first surrounding vehicle.

13. The non-transitory computer readable medium of claim 11, wherein the position coordinates of the surrounding vehicle are measured by a light detection and ranging (Lidar) sensor.

14. The non-transitory computer readable medium of claim 11, wherein the traveling trajectory is expressed by the following Equation A.

$$a_0 + a_1 x + a_2 x^2 + a_3 x^3 = y \quad (A)$$

wherein, the $a_0$, $a_1$, $a_2$, $a_3$ are the coefficients of the polynomial and are a constant, and x and y are position coordinates.

15. The non-transitory computer readable medium of claim 12, wherein the vehicle model is any one of a dynamic model and a Kinematic model.

\* \* \* \* \*